(12) United States Patent
Kuang et al.

(10) Patent No.: US 12,556,696 B2
(45) Date of Patent: Feb. 17, 2026

(54) VIDEO CODING METHOD AND APPARATUS, MEDIUM, AND ELECTRONIC DEVICE

(71) Applicant: TENCENT TECHNOLOGY (SHENZHEN) COMPANY LIMITED, Shenzhen (CN)

(72) Inventors: Wei Kuang, Shenzhen (CN); Hongbin Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 71 days.

(21) Appl. No.: 18/463,916

(22) Filed: Sep. 8, 2023

(65) Prior Publication Data

US 2023/0421763 A1    Dec. 28, 2023

Related U.S. Application Data

(63) Continuation of application No. PCT/CN2022/106235, filed on Jul. 18, 2022.

(30) Foreign Application Priority Data

Jul. 28, 2021  (CN) .......................... 202110853942.4

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/172* (2014.11); *H04N 19/96* (2014.11)

(58) Field of Classification Search
CPC .......................... H04N 19/119; H04N 19/105
See application file for complete search history.

(56) References Cited

U.S. PATENT DOCUMENTS 8,879,626 B2 * 11/2014 Alshina ............... H04N 19/117
                                                       382/233
11,968,364 B2 * 4/2024 Lee ........................ H04N 19/91
(Continued)

FOREIGN PATENT DOCUMENTS

CN         107371022 A      11/2017
CN         110213581 A       9/2019
(Continued)

OTHER PUBLICATIONS

China National Intellectual Property Administration (CNIPA) Office Action for 202110853942 Sep. 7, 2021 14 Pages (including translation).
(Continued)

*Primary Examiner* — Irfan Habib
(74) *Attorney, Agent, or Firm* — Anova Law Group, PLLC

(57) ABSTRACT

This application relates to the field of video coding and decoding technologies, and specifically, to a video coding method and apparatus, a medium, and an electronic device. The video coding method includes obtaining a current video frame, and determining a reference frame used when coding the current video frame; searching for partition modes used for performing block partition on a portion of the current video frame to be coded; skipping one or more partition modes according to coding information of the reference frame or coding information of a coded portion of the current video frame; and performing predictive coding on coding units that constitute the portion to be coded according to an identified partition mode.

18 Claims, 9 Drawing Sheets

(51) Int. Cl.
*H04N 19/172* (2014.01)
*H04N 19/96* (2014.01)

(56) References Cited

U.S. PATENT DOCUMENTS

| | | | | |
|---|---|---|---|---|
| 2011/0096829 | A1* | 4/2011 | Han | H04N 19/124 |
| | | | | 375/E7.126 |
| 2011/0170593 | A1* | 7/2011 | Kim | H04N 19/119 |
| | | | | 375/240.12 |
| 2011/0310973 | A1* | 12/2011 | Cheon | H04N 19/18 |
| | | | | 375/240.18 |
| 2012/0106629 | A1* | 5/2012 | Zheng | H04N 19/70 |
| | | | | 375/E7.126 |
| 2012/0328015 | A1* | 12/2012 | Kim | H04N 19/179 |
| | | | | 375/E7.223 |
| 2013/0003855 | A1* | 1/2013 | Park | H04N 19/52 |
| | | | | 375/240.18 |
| 2013/0188742 | A1 | 7/2013 | Raveendran et al. | |
| 2014/0161189 | A1* | 6/2014 | Zhang | H04N 19/103 |
| | | | | 375/240.16 |
| 2016/0080738 | A1 | 3/2016 | Kim et al. | |
| 2016/0286229 | A1* | 9/2016 | Li | H04N 19/57 |
| 2017/0347128 | A1* | 11/2017 | Panusopone | H04N 19/174 |
| 2019/0306506 | A1 | 10/2019 | Chen et al. | |
| 2020/0359010 | A1* | 11/2020 | Lee | H04N 19/61 |

FOREIGN PATENT DOCUMENTS

| | | | |
|---|---|---|---|
| CN | 110913232 | A | 3/2020 |
| CN | 111263145 | A | 6/2020 |
| CN | 111711815 | A | 9/2020 |
| CN | 111988607 | A | 11/2020 |
| CN | 111988628 | A | 11/2020 |
| CN | 112104868 | A | 12/2020 |
| CN | 112714314 | A | 4/2021 |
| CN | 113014925 | A | 6/2021 |
| CN | 113315967 | A | 8/2021 |
| JP | 2014204208 | A | 10/2014 |

OTHER PUBLICATIONS

The World Intellectual Property Organization (WIPO) International Search Report for PCT/CN2022/106235 Oct. 10, 2022 14 Pages (including translation).

F. Bossen, K. Sühring, X. Li, Reference software for versatile video coding (Draft 2), document JVET-U2009, Joint Video Exploration Team (JVET), Jan. 2021.

H. Huang, K. Zhang, Y.-W. Huang, and S. Lei, EE2.1: Quadtree plus binary tree structure integration with JEM tools, document JVET-C0024, Joint Video Exploration Team (JVET), May 2016.

A. Wieckowski, T. Hinz, B. Bross, T. Nguyen, J. Ma, K. Suehring, H. Schwarz, D. Marpe, and T. Wiegand, NextSoftware as Test Software, document JVET-J0095, Joint Video Experts Team (JVET), Apr. 2018.

A. Wieckowski, T. Hinz, V. George, J. Brandenburg, J. Ma, B. Bross, H. Schwarz, D. Marpe, and T. Wiegand, NextSoftware: An alternative implementation of the Joint Exploration Model (JEM), document H0084, Joint Video Exploration Team (JVET), Oct. 2017.

* cited by examiner

VIDEO CODING METHOD AND APPARATUS, MEDIUM, AND ELECTRONIC DEVICE

RELATED APPLICATIONS

This application is a continuation of PCT Application No. PCT/CN2022/106235, filed on Jul. 18, 2022, which claims priority to Chinese Patent Application No. 202110853942.4, filed with the Chinese Patent Office on Jul. 28, 2021, and entitled "VIDEO CODING METHOD AND APPARATUS, MEDIUM, AND ELECTRONIC DEVICE". The two applications are incorporated by reference in their entirety.

FIELD OF THE TECHNOLOGY

This application relates to the field of video coding and decoding technologies, and specifically, to a video coding method, a video coding apparatus, a computer-readable medium, and an electronic device.

BACKGROUND OF THE DISCLOSURE

In video coding technologies, one video frame may be partitioned into small coding units step by step through a tree structure. The partition of the coding units needs to adapt to video content in the video frame to improve video compression efficiency as much as possible, and reduce coding loss.

A plurality of different types of partition modes may provide more options for the partition of the coding units, but it also increases the complexity of a coder, so that a video coding speed is reduced.

SUMMARY

An objective of this application is to provide a video coding method, a video coding apparatus, a computer-readable medium, and an electronic device, to at least overcome the technical problems in related technologies of high coding complexity and slow coding speed to some extent.

Other features and advantages of this application become obvious through the following detailed descriptions or are partially learned through the practice of this application.

One aspect of the embodiments of this application provides a video coding method. The video coding method includes obtaining a current video frame, and determining a reference frame used when coding the current video frame; searching for partition modes used for performing block partition on a portion of the current video frame to be coded; skipping one or more partition modes according to coding information of the reference frame or coding information of a coded portion of the current video frame; and performing predictive coding on coding units that constitute the portion to be coded according to an identified partition mode.

According to one aspect of the embodiments of this application, a computer-readable medium is provided. The computer-readable medium has a computer program stored thereon, and when the computer program is executed by a processor, the video coding method according to the aforementioned technical solution is implemented.

According to one aspect of the embodiments of this application, an electronic device is provided. The electronic device includes: a processor; and a memory, configured to store an instruction executable by the processor, the processor being configured to execute the executable instruction to implement the video coding method according to the aforementioned technical solution.

In embodiments of this application, predictive coding is performed on the portion to be coded of the current video frame by using the coding information of the reference frame or the coding information of the coded portion of the current video frame, so that the coding speed can be increased by using historical coding information, thereby improving coding efficiency.

It is to be understood that the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts.

DESCRIPTION OF EMBODIMENTS

Implementations are described more thoroughly with reference to the accompanying drawings below. However, the exemplary implementations may be implemented in multiple forms, and it is not to be understood as being limited to the examples described herein. Conversely, these implementations are provided to make this application more comprehensive and complete, and comprehensively convey the concept of the exemplary implementations to a person skilled in the art.

In addition, the described features, structures or characteristics may be combined in one or more embodiments in any appropriate mode. In the following descriptions, a lot of specific details are provided to give a full understanding of the embodiments of this application. However, a person skilled in the art is to be aware that, the technical solutions of this application may be implemented without one or more particular details, or another method, element, apparatus, or step may be used. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not necessarily include all content and operations/steps, and are not necessarily performed in the described order, either. For example, some operations/steps may be further divided, while some operations/steps may be combined or partially combined. Therefore, an actual execution order may change according to an actual case.

"A plurality of" mentioned in the specification means two or more. "And/or" describes an association relationship for describing associated objects and represents that three relationships may exist. For example, A and/or B may represent the following three cases: only A exists, both A and B exist, and only B exists. The character "/" generally indicates an "or" relationship between the associated objects.

Figure 1:
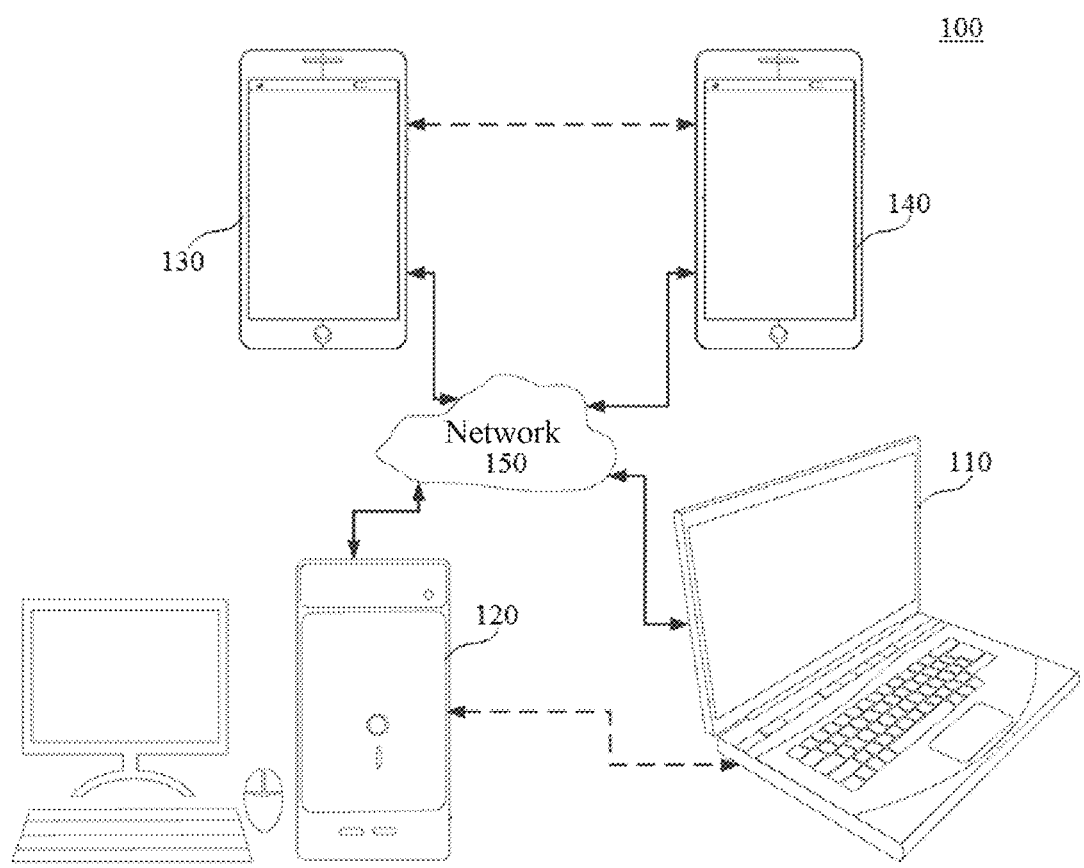
FIG. 1 is a schematic diagram of a system architecture according to an embodiment of this application.

FIG. 1 is a schematic diagram of a system architecture according to an embodiment of this application.

As shown in FIG. 1, a system architecture 100 includes a plurality of terminal devices. The terminal devices may communicate with each other through, for example, a network 150. For example, the system architecture 100 may include a first terminal device 110 and a second terminal device 120 that are connected with each other through the network 150. In the embodiment of FIG. 1, the first terminal device 110 and the second terminal device 120 execute unidirectional data transmission.

For example, the first terminal device 110 may code video data (such as a video picture stream collected by the terminal device 110) to transmit same to the second terminal device 120 through the network 150. The coded video data is transmitted in a form of one or more coded video streams. The second terminal device 120 may receive the coded video data from the network 150, decode the coded video data to recover the video data, and display a video picture according to the recovered video data.

In one embodiment of this application, the system architecture 100 may include a third terminal device 130 and a fourth terminal device 140 that perform bidirectional transmission on the coded video data. The bidirectional transmission may, for example, take place during a video conference. For bidirectional data transmission, each of the third terminal device 130 and the fourth terminal device 140 may code the video data (such as the video picture stream collected by the terminal apparatus) to transmit the coded video data to the other of the third terminal device 130 and the fourth terminal device 140 through the network 150. Either of the third terminal device 130 and the fourth terminal device 140 may also receive the coded video data transmitted by the other of the third terminal device 130 and the fourth terminal device 140, may decode the coded video data to recover the video data, and may display the video picture on an accessible display apparatus based on the recovered video data.

In the embodiment of FIG. 1, the first terminal device 110, the second terminal device 120, the third terminal device 130, and the fourth terminal device 140 may be servers, personal computers, and smart phones, but the principles disclosed in this application are not limited thereto. The embodiment disclosed in this application is suitable for laptop computers, tablet computers, media players, and/or dedicated video conference devices. The network 150 represents any number of networks that include, for example, wired and/or wireless communication networks, and transmit the coded video data among the first terminal device 110, the second terminal device 120, the third terminal device 130, and the fourth terminal device 140. The communication network 150 can exchange data in a circuit switched and/or packet switched channel. The network may include a telecommunication network, a local area network, a wide area network, and/or the Internet. For the purposes of this application, unless explained below, the architecture and topology of the network 150 may be inconsequential to operations disclosed in this application.

Figure 2:
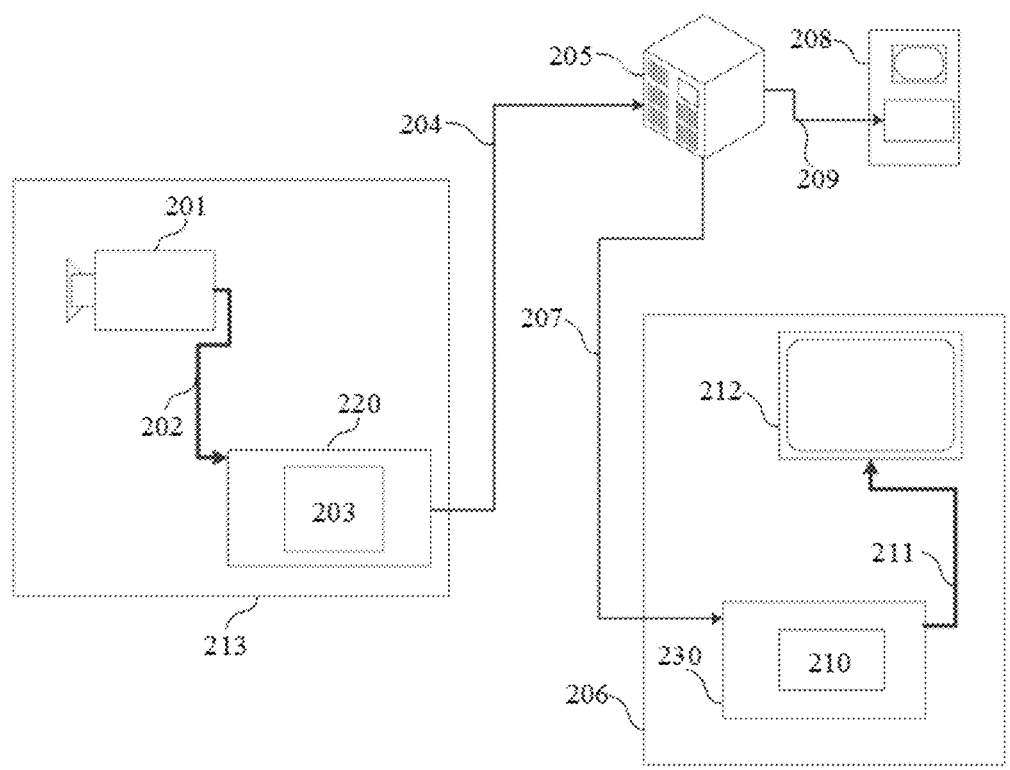
FIG. 2 shows a placement mode of a video coding apparatus and a video decoding apparatus in a streaming transmission environment.

In one embodiment of this application, FIG. 2 shows a placement mode of a video coding apparatus and a video decoding apparatus in a streaming transmission environment. The subject matter disclosed in this application may be equally applicable to other video-supported applications, including, for example, video conferencing, digital television (TV), storage of compressed videos on digital media including CDs, DVDs, memory sticks, etc.

A streaming transmission system may include a collection subsystem 213; the collection subsystem 213 may include a digital camera and other video sources 201; the video source creates an uncompressed video picture stream 202. In an embodiment, the video picture stream 202 includes a sample photographed by the digital camera. Compared with coded video data 204 (or a coded video code stream 204), the video picture stream 202 is depicted as a bold line to emphasize the video picture stream with a high data volume. The video picture stream 202 may be processed by an electronic apparatus 220. The electronic apparatus 220 includes a video coding apparatus 203 coupled to the video source 201. The video coding apparatus 203 may include hardware, software, or a combination of software and hardware to implement or execute each aspect of the disclosed subject matter disclosed that is described below in detail. Compared with the video picture stream 202, the coded video data 204 (or the coded video code stream 204) is depicted as a thin line to emphasize the coded video data 204 (or the coded video code stream 204) with a relatively low data volume, and may be stored on a streaming transmission server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 of an electronic apparatus 230. The video decoding apparatus 210 decodes the transmitted copy 207 of the coded video data and generates an output video picture stream 211 that may be presented on a display 212 (for example, a display screen) or another presentation apparatus. In some streaming transmission system, the coded video data 204, video data 207, and video data 209 (for example, the video code stream) may be coded according to certain video coding/compression standards. An embodiment of these standards includes ITU-T H.265. In an embodiment, video codec standards under development are informally known as versatile video coding (VVC) and this application may be used in the context of VVC standards.

The electronic apparatus 220 and the electronic apparatus 230 may include other components that are not shown in the drawings. For example, the electronic apparatus 220 may include the video decoding apparatus, and the electronic apparatus 230 may also include the video coding apparatus.

In one embodiment of this application, by taking international video codec standards, i.e., high efficiency video coding (HEVC), versatile video coding (VVC), and China's national video codec standards AVS as an example, after a video frame image is inputted, according to a block size, the video frame image is partitioned into several non-overlapping processing units, and each processing unit performs similar compression operation. The processing unit is referred to as a coding tree unit (CTU), or a largest coding unit (LCU). Furthermore, the CTU may be further divided more finely to obtain one or more basic coding units (CU). The CU is the most basic element in a coding link. Some concepts during coding of the CU are introduced as follows:

Predictive coding: predictive coding includes intra-frame prediction, inter-frame prediction, and other modes; after an original video signal is predicted by using a selected reconstructed video signal, a residual video signal is obtained. A coding end needs to decide to select which predictive coding mode for a current CU and inform a decoding end of the selected predictive coding mode. The Intra-frame prediction means that a predicted signal comes from a coded and reconstructed region in a same image. The Inter-frame prediction means that the predicted signal comes from another coded image (referred to as a reference image) that is different from a current image.

Transform & quantization: after undergoing discrete Fourier transform (DFT), discrete cosine transform (DCT) and other transform operations, the residual video signal is transformed into a transform domain, which is referred to as a transform coefficient. A lossy quantization operation is further performed on the transform coefficient, and a certain amount of information is lost, so that a quantized signal facilitates compressed expression. In some video coding standards, there may be more than one transform mode for selection. Therefore, the coding end also needs to select one of the transform modes for the current CU and inform the decoding end of the selected transform mode. The degree of fineness of quantization is usually determined by a quantization parameter (QP). A large value of the QP indicates that the coefficients within a larger value range are to be quantized into a same output, and therefore, it would usually bring greater distortion and a lower bit rate. On the contrary, a small value of the QP means that the coefficients within a smaller value range are to be quantized into a same output, and therefore, it would usually bring less distortion and correspond to a higher bit rate.

Entropy coding or statistical coding: statistical compression coding is performed on a quantized signal in the transform domain according to a frequency of occurrence of each value, and finally, a binarized (0 or 1) compressed code stream is outputted. In addition, entropy coding is also needed to be performed on other information generated by coding, such as a selected coding mode and motion vector data, to reduce a bit rate. Statistical coding is a lossless coding mode that can effectively reduce the bit rate required to express a same signal. A common statistical coding mode includes variable length coding (VLC) or content adaptive binary arithmetic coding (CABAC).

A content adaptive binary arithmetic coding (CABAC) process mainly includes three steps: binarization, context modeling, and binary arithmetic coding. After binarization is performed on an inputted syntax element, binary data may be coded using a conventional coding mode or a bypass coding mode. In the bypass coding mode, there is no need to assign a specific probability model to each binary bit. An inputted binary bin value is directly coded by a simple bypass coder to speed up overall coding and decoding speeds. In general, different syntax elements are not completely independent from each other, and the same syntax elements themselves also have certain memorability. Therefore, according to a conditional entropy theory, using other coded syntax elements for conditional coding can further improve coding performance with respect to independent coding or memoryless coding. This coded information used as conditions are referred to as a context. In the conventional coding mode, the binary bits of the syntax element sequentially enter a context coder. The coder assigns a suitable probability model to each inputted binary bit according to a value of a previously coded syntax element or binary bit. This process is referred to as context modeling. The context model corresponding to the syntax element can be located through context index increment (ctxIdxInc) and context index start (ctxIdxStart). After both the bin value and the assigned probability model are sent to a binary arithmetic coder for coding, the context model needs to be updated according to the bin value, i.e., an adaptive process during coding.

Loop filtering: operations such as inverse quantization, inverse transform, and predictive compensation are performed on a transformed and quantized signal to obtain a reconstructed image. Upon comparison, some information of the reconstructed image is different from that of an original image due to a quantization influence, that is, the reconstructed image generates distortion. Therefore, filtering operations such as deblocking filter (DB), sample adaptive offset (SAO), or adaptive loop filter (ALF) may be performed on the reconstructed image, which can effectively reduce the degree of distortion caused by quantization. Since these filtered reconstructed images will be used as a reference for subsequent coded images to predict future image signals, the filtering operation above is also called as loop filtering, that is, a filtering operation within a coding loop.

Figure 3:
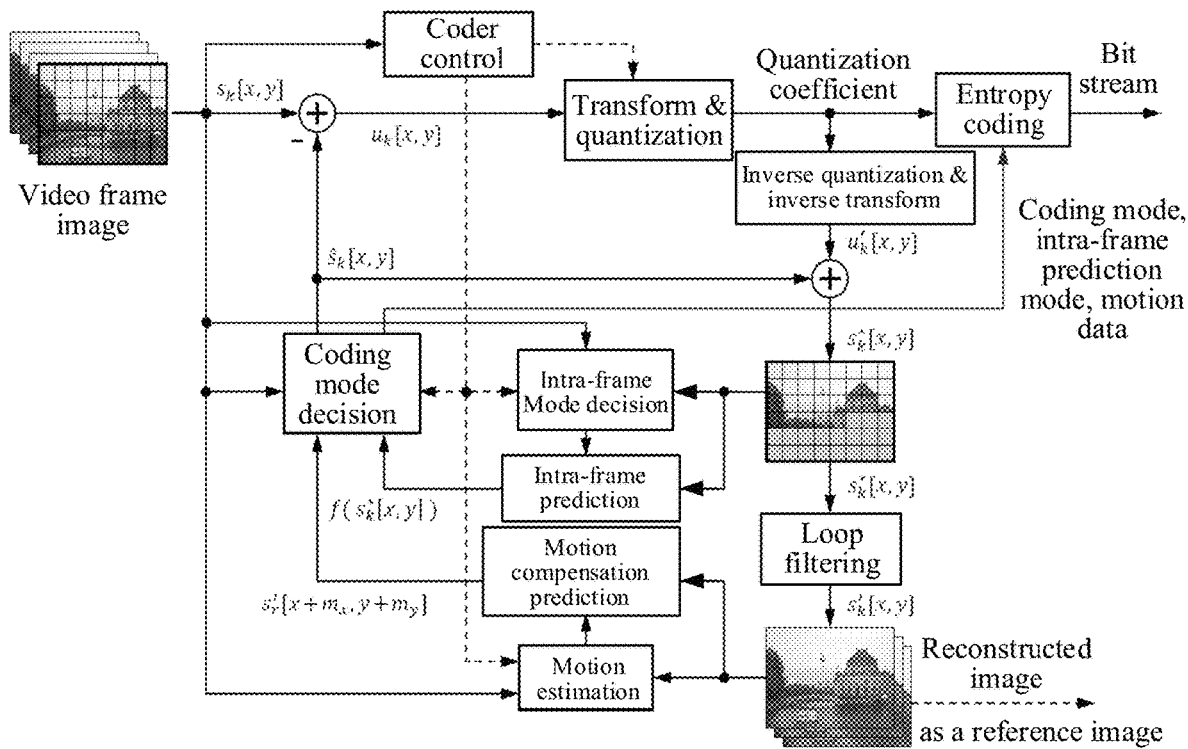
FIG. 3 is a basic flowchart of a video coder.

In an embodiment of this application, FIG. 3 is a basic flowchart of a video coder. In this process, intra-frame prediction is taken as an example for illustration. A residual signal $u_k[x, y]$ is obtained by calculating a difference value between an original image signal $s_k[x, y]$ and a predicted image signal $\hat{s}_k[x, y]$, and a quantization coefficient is obtained after the residual signal $u_k[x, y]$ is transformed and quantized. In one aspect, a coded bit stream is obtained by performing entropy coding on the quantization coefficient, and in another aspect, a reconstructed residual signal $u'_k[x, y]$ is obtained through inverse quantization and inverse transform processing. The predicted image signal $\hat{s}_k[x, y]$ and the reconstructed residual signal $u'_k[x, y]$ are superimposed to generate an image signal $s*_k[x, y]$. In one aspect, the image signal $s*_k[x, y]$ is inputted to an intra-frame mode decision module and an intra-frame prediction module for intra-frame prediction processing, and in another aspect, a reconstructed image signal $s'_k[x, y]$ is outputted through loop filtering. The reconstructed image signal $s'_k[x, y]$ may be used as a reference image of a next frame for motion estimation and motion compensation prediction. Then, a predicted image signal $\hat{s}_k[x, y]$ of the next frame is obtained based on a motion compensation prediction result $s'_r[x+m_x, y+m_y]$ and an intra-frame prediction result $f(s*_k[x, y])$, and the foregoing process is repeated until coding is completed.

Based on the foregoing coding process, entropy decoding is performed on each CU at a decoding end after obtaining the compressed code stream (i.e., a bit stream), to obtain each mode information and quantization coefficient. Then, inverse quantization and inverse transform are performed on the quantization coefficient to obtain the residual signal. In another aspect, a predicted signal corresponding to the CU may be obtained according to known coding mode information. Then, after the residual signal and the predicted signal are superimposed, a reconstructed signal may be obtained. Loop filtering and other operations are performed on the reconstructed signal to generate a final output signal.

Based on the foregoing introduction to a coding process, it may be known that one frame of image in a video signal may be partitioned into non-overlapping coding tree units (CTU) during video coding. In an embodiment, a block size of one CTU may be set to be 64×64, 128×128, and the like. The embodiment of this application does not limit the block size of the CTU. For example, the CTU having the block size of 128×128 may be a matrix pixel dot matrix including 128 columns, each column includes 128 pixels, and each pixel includes a brightness component and/or a chromaticity component. It may be continued to further partition the CTU more finely to obtain a group of coding units (CU), and the group of CUs may include one or more CU. One or a combination of more of quaternary tree (QT), binary tree (BT), ternary tree (TT), and other partition modes may be used for partitioning the coding tree unit (CTU). According to different partition directions, the BT may further include horizontal binary tree (HBT) and vertical binary tree (VBT), and the TT may further include horizontal ternary tree (HTT) and vertical ternary tree (VTT).

For a certain coding tree unit (CTU), the CTU may be used as a root node and partitioned into a plurality of nodes. One node corresponds to an image region. If a certain node is not further partitioned, the node is called as a leaf node, and the image region corresponding to the node forms a CU. If the node is further partitioned, the node is partitioned into a plurality of sub regions by using one of the foregoing partition modes or a combination of a plurality of partition modes, each sub region corresponds to a sub node, and then it is needed to determine whether these sub nodes are further partitioned. For example, if a partition level of the root node is 0, a partition level of the sub node may be a partition level of a parent node increased by 1. During video coding, a coder is generally provided with the CU having a minimum block size. During partition, if the block size of a certain node is equal to the minimum block size, the node is not continuously partitioned by default. To facilitate expression, "the image region corresponding to the node" is referred to as "node" below.

Figure 4:
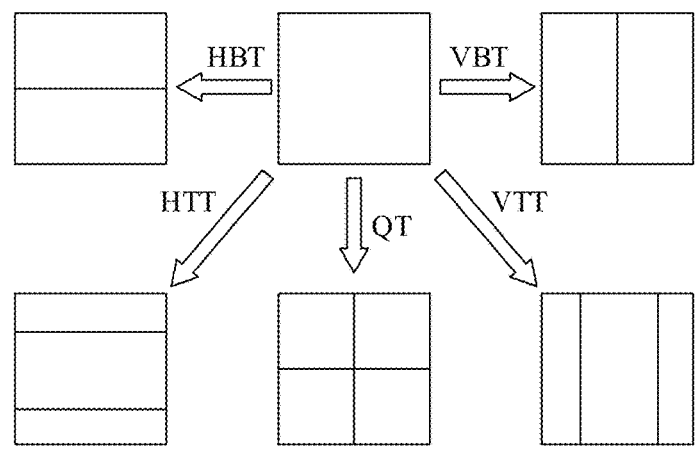
FIG. 4 schematically illustrates partition results obtained by using a plurality of partition modes.

FIG. 4 schematically illustrates partition results obtained by using a plurality of partition modes.

For a certain node, the node may be partitioned into four sub nodes by using a QT partition mode. As shown in FIG. 4, according to the QT partition mode, the node may be partitioned into four sub nodes having a same block size. A width and height of each sub node are also identical, the width is half of a width of the node before partition, and the height is half of a height of the node before partition.

For example, for a node having a block size of 64×64, if it is not continued to partition the node, the node is directly used as a CU having a block size of 64×64. If it is continued to partition the node, according to the QT partition mode, the node may be partitioned into four nodes having a block size of 32×32. For a certain node in the four nodes having the block size of 32×32, if it is continued to partition the node, four nodes having a block size of 16×16 are generated.

For a certain node, the node may be partitioned into two sub nodes by using a BT partition mode. In an embodiment, the BT partition mode includes two types: an HBT partition mode and a VBT partition mode. According to the HBT partition mode, the node is partitioned into upper and lower sub nodes having a same block size. A width and height of each sub node are also identical, the width is half of a width of the node before partition, and the height is half of a height of the node before partition. According to the VBT partition mode, the node is partitioned into left and right sub nodes having a same block size. A width and height of each sub node are also identical, the width is half of a width of the node before partition, and the height is half of a height of the node before partition.

For example, for the node having the block size of 64×64, if it is not continued to partition the node, the node is directly used as the CU having the block size of 64×64. If it is continued to partition the node, the node may be partitioned into two nodes having the block size of 64×32 according to the HBT partition mode or may be partitioned into two nodes having the block size of 32×64 according to the VBT partition mode.

For a certain node, the node may be partitioned into three sub nodes by using a TT partition mode. In an embodiment, the TT partition mode includes two types: an HTT partition mode and a VTT partition mode. According to the HTT partition mode, the node is partitioned into upper, middle and lower sub nodes. A width of either of the upper and lower sub nodes is equal to a width of the node before partition, and a height is quarter of a height of the node before partition; and a width of the middle sub node is equal to the width of the node before partition, and a height is half of the height of the node before partition. According to the VTT partition mode, the node is partitioned into left, middle, and right sub nodes. A width of either of the left and right sub nodes is quarter of a width of the node before partition, and a height is equal to a height of the node before partition; and a width of the middle sub node is half of the width of the node before partition, and a height is equal to the width of the node before partition.

In related technologies, to compare the rate distortion costs of the partition modes, it is needed to perform motion estimation on the CUs that are obtained by using the partition modes, to calculate the displacement vectors of the CUs. In some embodiments of this application, the displacement vectors may have different names based on different prediction modes and different implementation modes. For example, a displacement vector in an inter-frame prediction mode is called as a motion vector (MV); a displacement vector in an IBC prediction mode is called as a block vector (BV); and a displacement vector in an intra string copy (ISC) prediction mode is called as a string vector (SV). Intra string copy is also called as "string prediction" or "string matching", etc.

For example, after a coding tree unit (CTU) to be coded is partitioned by using a first partition mode, ME is performed on the CUs obtained by means of partition to calculate the displacement vector of each CU, to calculate an RD cost of the first partition mode; then the to-be-coded CTU is partitioned by using a second partition mode, and an RD cost of the second partition mode is calculated; and finally, an optimal partition mode is determined by comparing the calculated RD costs.

The technical solutions of a video coding method, a video coding apparatus, a computer-readable medium, an electronic device and the like provided by this application are described in detail below with reference to specific implementations.

Figure 5:
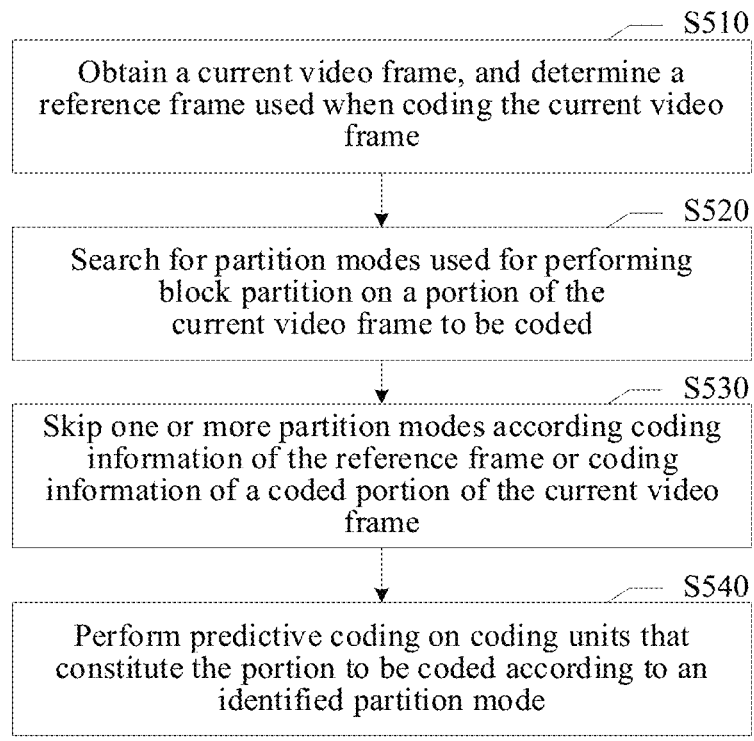
FIG. 5 is a flowchart of the steps of a video coding method according to an embodiment of this application.

FIG. 5 is a flowchart of the steps of a video coding method according to an embodiment of this application. As shown in FIG. 5, the method may include steps S510 to S540.

Step S510. Obtain a current video frame and determine a reference frame to which reference is made during coding of the current video frame.

To improve precision, during coding of the current video frame, one or two images most matched with the current video frame are selected from a group of previous or subsequent coding images and used as reference frames to which reference is made during inter-frame coding. Although complexity is increased, prediction precision is significantly improved.

A coder codes a plurality of images to form multiple segments of group of pictures (GOP), and a decoder reads and decodes the multiple segments of GOPs during playback, and then obtains the pictures and performs rendering display. GOP is a group of consecutive pictures, is composed of one I frame and a plurality of B frames/P frames and is a basic unit for access of a video image coder and a video image decoder. The arrangement sequence of the GOP will be repeated until video images are ended.

The I frame is also called as an intra-coded frame, is an independent frame carrying all information, and may be independently decoded without referring to other images. The I frame may be simply understood as a static picture.

The P frame is also called as an inter-frame predictive-coded frame and needed to be coded with reference to the previous I frame. The P frame indicates a difference between the picture of a current frame and a previous frame (the previous frame may be the I frame and may also be the P frame). During decoding, it is needed to use a previously buffered picture and a difference defined by the frame to generate a final picture.

The B frame is also called as a bidirectional predictive-coded frame. The B frame records a difference between the current video frame and a previous video frame as well as a next video frame. During decoding of the B frame, both the previously buffered picture and a decoded picture need to be obtained, and a final picture is obtained by using a previous picture, a subsequent picture, and data of the frame.

Step S520. Search for partition modes used for performing block partition on a portion to be coded of the current video frame.

Figure 6:
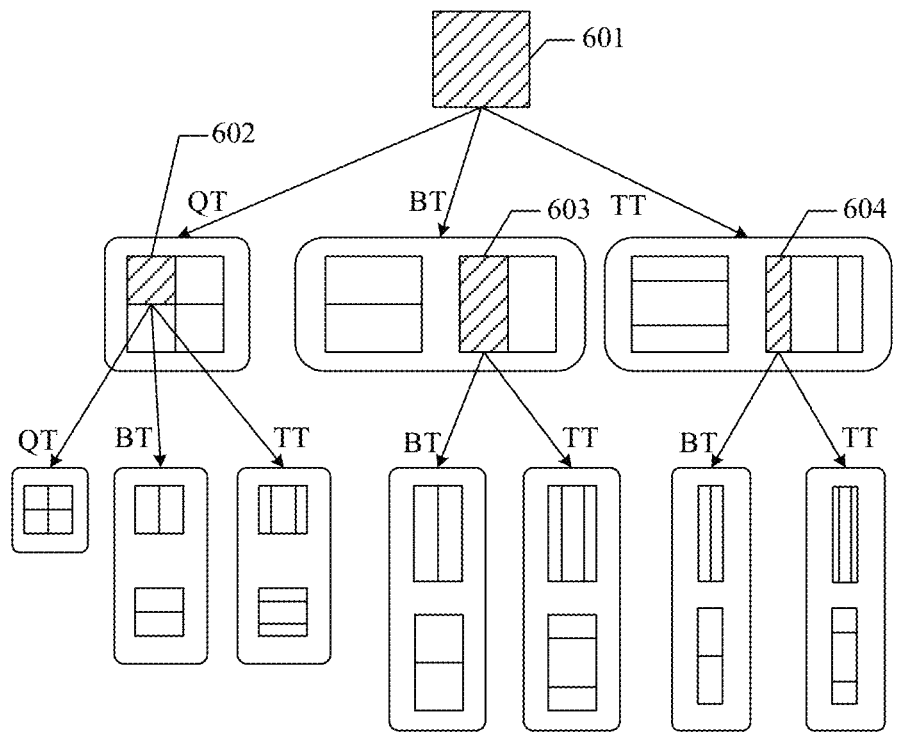
FIG. 6 is a schematic diagram of a tree structure for searching for a partition mode according to an embodiment of this application.

FIG. 6 is a schematic diagram of a tree structure for searching for a partition mode according to an embodiment of this application. As shown in FIG. 6, for a coding unit 601, QT, BT, and TT partition modes may be first respectively used for performing block partition to obtain corresponding sub coding units.

When the QT partition mode is used, quaternary tree partition is performed on the coding unit 601, so that four square first sub coding units 602 having a same size may be obtained. It may also be continued to further perform block partition on each sub coding unit by selecting any one of the QT, BT, and TT partition modes until the obtained sub coding units reach a specified minimum size.

When the BT partition mode is used, binary tree partition is performed on the coding unit 601, so that two rectangular second sub coding units 603 may be obtained. According to different partition directions, two partition results obtained by performing partition in a vertical (Ver.) direction and in a horizontal (Hor.) direction may be included. By taking binary tree partition in the vertical direction as an example, it may be continued to select either of the BT and TT partition modes to further perform block partition on the second sub coding units 603 obtained after the binary tree partition, until the obtained sub coding units reaches the specified minimum size.

When the TT partition mode is used, ternary tree partition is performed on the coding unit 601, so that three rectangular third sub coding units 604 may be obtained. According to different partition directions, two partition results obtained by performing partition in the vertical (Ver.) direction and in the horizontal (Hor.) direction may be included. By taking ternary tree partition in the vertical direction as an example, it may be continued to select either of the BT and TT partition modes to further perform block partition on the third sub coding units 604 obtained after the binary tree partition, until the obtained sub coding units reaches the specified minimum size.

Step S530. Skip some of partition modes to be searched according to coding information of the reference frame or coding information of a coded portion of the current video frame.

The current video frame is coded after the reference frame thereof. That is, when the current video frame is coded, the coding of the reference frame thereof has been finished, and the current video frame and the reference frame thereof have a certain content correlation in image content. Therefore, the coding information of the reference frame may be used for guiding the coding process of the current video frame. For example, block partition may be performed on the current video frame by using a coding block partition result of the reference frame, so that calculation complexity is reduced, and a block partition process is accelerated.

During coding of the current video frame, a coder may partition the current video frame into a plurality of coding units according to different partition modes, and respectively performs predictive coding on the coding units. During block partition, after block partition is performed according to different partition modes, predictive coding may be performed on the obtained coding units, so that the rate distortion costs under the partition modes, and the partition mode with a lowest rate distortion cost is selected for predictive coding.

Step S540. Perform, according to a found partition mode, predictive coding on coding units that constitute the portion to be coded.

According to the found partition mode, block partition may be performed on the portion to be coded of the current video frame to obtain the coding units that constitute the portion to be coded, and on the basis of block partition, predictive coding may be further performed on each coding unit.

It may be known from the tree structure for searching for the partition mode shown in FIG. 6 that when block partition is performed on the coding units, different partition modes may be combined to form a plurality of different partition paths, where each partition path has different rate distortion costs. During block partition of the current video frame, a to-be-searched and portion to be coded may be guided on the basis of a portion that has been searched and coded, such as skipping some of the partition modes to be searched, so that the block partition process is accelerated.

In the video coding method provided by an embodiment of this application, predictive coding is performed on the portion to be coded of the current video frame by using the coding information of the reference frame or the coding information of the coded portion of the current video frame, so that a coding speed can be increased by fully utilizing historical coding information, thereby improving coding efficiency.

In some implementations, predictive coding may be performed on the portion to be coded of the current video frame individually according to the coding information of the reference frame, predictive coding may also be performed on the portion to be coded of the current video frame individually according to the coding information of the coded portion of the current video frame, or predictive coding may also be performed on the portion to be coded of the current video frame according to the coding information of the reference frame and the coding information of the coded portion of the current video frame.

Figure 7:
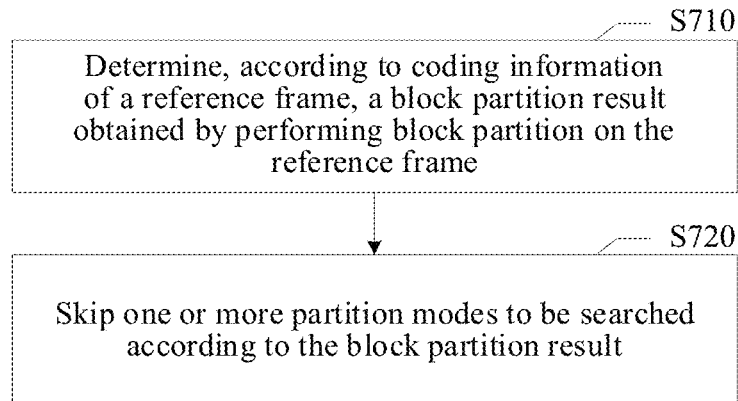
FIG. 7 is a flowchart of the steps of performing predictive coding on a portion of a current video frame to be coded according to coding information of a reference frame according to an embodiment of this application.

FIG. 7 is a flowchart of the steps of performing predictive coding on a portion of a current video frame to be coded according to coding information of a reference frame according to an embodiment of this application.

As shown in FIG. 7, based on the foregoing embodiment, the skipping some of partition modes to be searched according to coding information of the reference frame or coding information of a coded portion of the current video frame in step S530 may include the following steps S710 to S720.

Step S710. Determine, according to the coding information of the reference frame, a block partition result obtained by performing block partition on the reference frame.

The coding information of the reference frame includes a result obtained by performing predictive coding on each coding unit after the reference frame is partitioned into a plurality of coding units. The block partition result obtained by performing block partition on the reference frame may be determined according to the coding information of the reference frame. FIG. 4 schematically illustrates a block partition result of a coding tree unit in one reference frame. As shown in FIG. 4, based on a combination of a plurality of partition modes, such as QT, BT, and TT, one coding tree unit may be partitioned into a plurality of coding units having different sizes. One reference frame may include a plurality of coding tree units, and a corresponding block partition result may be determined for each coding tree unit.

Step S720. Skip some of the partition modes to be searched according to the block partition result.

During coding of the current video frame, the partition mode may be recursively searched according to the diagram of the tree structure shown in FIG. 6, so that a most suitable partition mode is finally found. In some related technologies, it is needed to traverse the partition modes on all paths according to the diagram of the tree structure shown in FIG. 6. In addition, in the technical solution provided by the embodiment of this application, the current video frame and the reference frame thereof have a large correlation in video content, i.e., the image pixel distribution conditions of the current video frame and the reference frame have large similarity, and thus, in the embodiment of this application, during block partition of the portion to be coded of the current video frame, some of the partition modes to be searched may be skipped according to the block partition result of the reference frame, so that the search range of the partition mode is reduced, a search process is accelerated, and search efficiency is improved.

Figure 8:
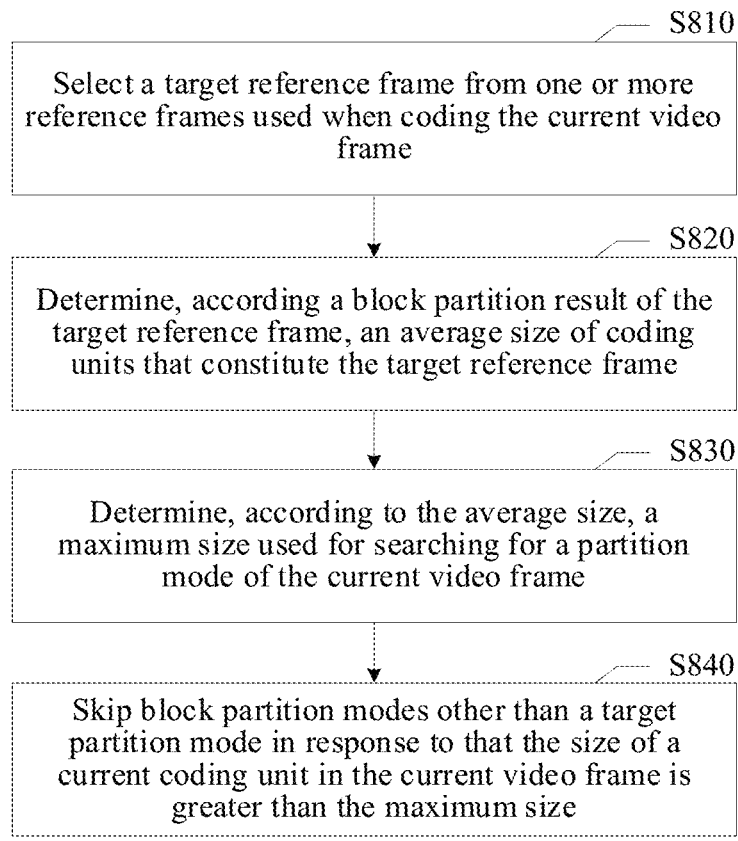
FIG. 8 is a flowchart of the steps of skipping partition modes on the basis of a block partition result of a reference frame according to an embodiment of this application.

FIG. 8 is a flowchart of the steps of skipping partition modes on the basis of a block partition result of a reference frame according to an embodiment of this application.

As shown in FIG. 8, based on the foregoing embodiment, the skipping some of the partition modes to be searched according to the block partition result in step S720 may include the following steps S810 to S840.

Step S810. Select a target reference frame from one or more reference frames to which reference is made during coding of the current video frame.

In one embodiment of this application, in response to that there is one reference frame to which reference is made during coding of the current video frame, the reference frame is selected as the target reference frame; and in response to that there are a plurality of reference frames to which reference is made during coding of the current video frame, the target reference frame is selected from the plurality of reference frames according to a quantization parameter of each video frame.

Quantization is a process of mapping a continuous value of a signal into a plurality of discrete amplitude values, thereby achieving many-to-one mapping of a signal value. After residual data is transformed, a transform coefficient has a large value range. Quantization can effectively reduce the value range of the signal, thereby obtaining a better compression effect.

The quantization parameter (QP) is a sequence number of a quantization step Qstep and reflects a spatial detail compression condition. A smaller QP indicates finer quantization, and in this case, image quality is better, and a generated code stream is also longer. In response to that the QP is small, most of image details are reserved. In response to that the QP is increased, some image details are lost, so that the bit rate is reduced, and image distortion is enhanced, and quality is reduced.

In one embodiment of this application, a method for selecting the target reference frame from the plurality of reference frames according to a quantization parameter of each video frame includes: determining quantization parameter difference values between the reference frames and the current video frame according to the quantization parameter of each video frame; and selecting a reference frame having a minimum quantization parameter difference value with the current video frame as the target reference frame.

In one embodiment of this application, in response to that there is one reference frame having the minimum quantization parameter difference value with the current video frame, the reference frame is selected as the target reference frame; and in response to that there are a plurality of reference frames having the minimum quantization parameter difference value with the current video frame, from the plurality of reference frames having the minimum quantization parameter difference value with the current video frame, a reference frame closest to the current video frame is selected as the target reference frame.

A difference of an average size of the CUs between the current video frame and the reference frame increases along with the increasing of the QP difference value between the current video frame and the reference frame. To reduce the difference of the average size of the CUs, the reference frame having the minimum QP difference value with the current video frame is used for deciding a maximum CU size allowed by the current video frame for search and detection. In response to that there are a plurality of reference frames having the minimum QP difference value with the current video frame, a first reference frame closest to the current video frame is selected as the target reference frame.

Step S820. Determine, according to a block partition result of the target reference frame, an average size of the coding units that constitute the target reference frame.

In one embodiment of this application, a width and height of each coding unit in the target reference frame are determined according to the block partition result of the target reference frame; an average width and an average height of the coding units in the target reference frame are determined according to the width and height of each coding unit in the target reference frame; and the average width or the average height is used as the average size of the coding units that constitute the target reference frame.

In one embodiment of this application, a larger value in the average width and the average height may be used as the average size of the coding units that constitute the target reference frame.

Step S830. Determine, according to the average size, a maximum size used for searching for the partition mode of the current video frame.

Figure 9:
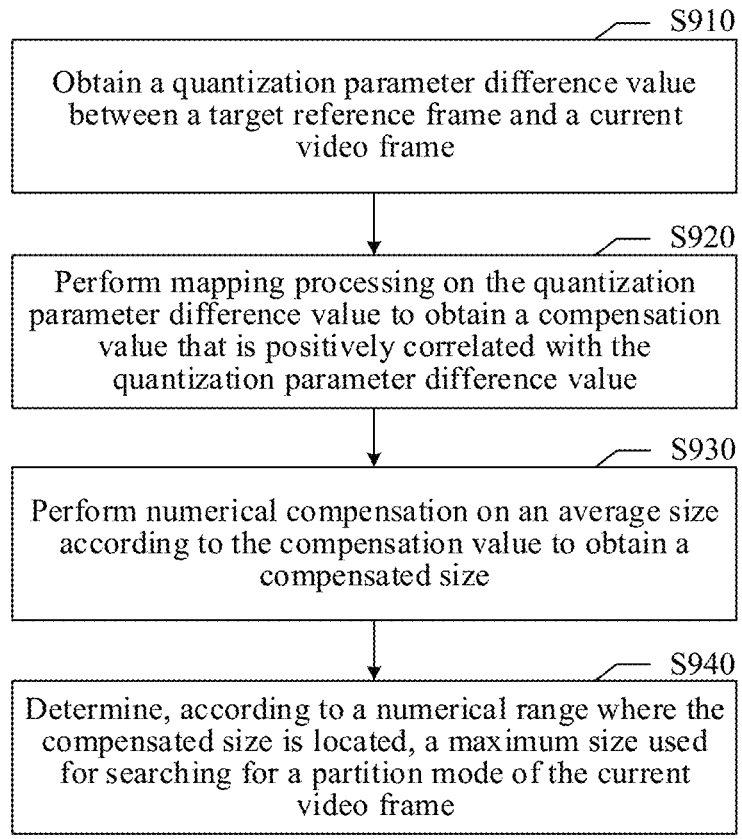
FIG. 9 is a flowchart of the steps of determining a maximum size used for searching for a partition mode of a current video frame according to an embodiment of this application.

FIG. 9 is a flowchart of the steps of determining a maximum size used for searching for a partition mode of a current video frame according to an embodiment of this application. As shown in FIG. 9, on the basis of the foregoing embodiment, the determining, according to the average size, a maximum size used for searching for the partition mode of the current video frame in step S830 may include the following steps S910 to S940.

Step S910. Obtain a quantization parameter difference value between the target reference frame and the current video frame.

Step S920. Perform mapping processing on the quantization parameter difference value to obtain a compensation value that is positively correlated with the quantization parameter difference value.

In one embodiment of this application, a product of the quantization parameter difference value and a preset compensation coefficient is used as a compensation value, and the compensation coefficient is a preset value greater than 0.

The quantization parameter difference value is recorded as ΔQP, and the compensation coefficient is recorded as γ, and thus, it may be determined that the compensation value is f(ΔQP)=ΔQP*γ. In one embodiment of this application, the value of the compensation coefficient γ is, for example, 2.5.

Step S930. Perform numerical compensation on the average size according to the compensation value to obtain a compensated size.

Step S940. Determine, according to a numerical range where the compensated size is located, the maximum size used for searching for the partition mode of the current video frame.

In one embodiment of this application, in response to that the compensated size is less than a preset first threshold, it is determined that the maximum size used for searching for the partition mode of the current video frame is a preset first size; in response to that the compensated size is greater than or equal to the first threshold and is less than a preset second threshold, it is determined that the maximum size used for searching for the partition mode of the current video frame is a preset second size; and in response to that the compensated size is greater than or equal to the second threshold, it is determined that the maximum size used for searching for the partition mode of the current video frame is a preset third size, where the first size, the second size, and the third size are in a multiple relationship of scaling up in equal proportion.

In one embodiment of this application, the first size is set to be 32, the second size is set to be 64, and the third size is set to be 128. Correspondingly, the maximum size used for searching for the partition mode of the current video frame may be determined according to the following formula:

$$\text{max\_check\_cu} = \begin{cases} 32, & \text{if } avg_{ref_{cu}} + f(\Delta QP) < \alpha \\ 64, & \text{if } avg_{ref_{cu}} + f(\Delta QP) < \beta \\ 128, & \text{otherwise} \end{cases}$$

In one embodiment of this application, the value of the first threshold α may be, for example, 15, and the value of the second threshold β may be, for example, 30.

Step S840. Skip, in response to that the size of a current coding unit in the current video frame is greater than the maximum size, other to-be-searched block partition modes than a target partition mode.

In one embodiment of this application, the partition modes to be searched include at least one of quaternary tree partition, horizontal binary tree partition, vertical binary tree partition, horizontal ternary tree partition, and vertical ternary tree partition, and the target partition mode is quaternary tree partition. In response to that the current coding unit is greater than the maximum size allowed by the current video frame for search and detection, QT partition is directly performed on the current coding unit without introducing other additional check. During coding of the current video frame, the reference frame to which reference is made has been coded, and thus, the embodiment of this application does not affect frame-level parallelism.

Figure 10:
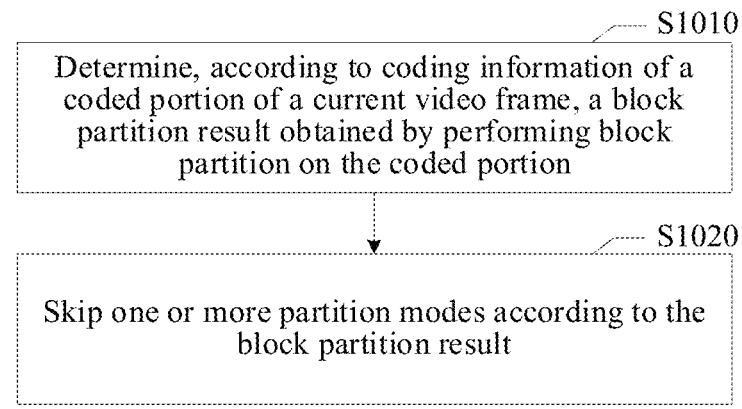
FIG. 10 is a flowchart of the steps of performing predictive coding on a portion of a current video frame to be coded according to coding information of a coded portion of a current video frame according to an embodiment of this application.

FIG. 10 is a flowchart of the steps of performing predictive coding on a portion of a current video frame to be coded according to coding information of a coded portion of a current video frame according to an embodiment of this application.

As shown in FIG. 10, based on the foregoing embodiment, the skipping some of partition modes to be searched according to coding information of the reference frame or coding information of a coded portion of the current video frame in step S530 may include the following steps S1010 to S1020.

Step S1010. Determine, according to the coding information of the coded portion of the current video frame, a block partition result obtained by performing block partition on the coded portion.

It may be known from the tree structure for searching for the partition mode shown in FIG. 6 that when block partition is performed on the current video frame, search is performed multiple times according to a path composed of different partition modes. During search, some of the coding units are coded to calculate the rate distortion costs thereof, and the coding information of the coded portion that is previously searched may be used for guiding the block partition process of a subsequent portion to be coded. For example, when the BT partition mode is selected, HBT partition and VBT partition may be respectively performed on the coding units, and after coding and rate distortion cost comparison, the HBT or the VBT is selected to perform block partition and coding on the coding units.

Step S1020. Skip some of the partition modes to be searched according to the block partition result.

During coding of the current video frame, the partition mode may be recursively searched according to the diagram of the tree structure shown in FIG. 6, so that a most suitable partition mode is finally found. In the technical solution provided by the embodiment of this application, the coding information of the coded portion that is previously searched may be used for guiding the block partition process of the subsequent portion to be coded. Specifically, some of the partition modes to be searched may be skipped according to the block partition result of the coded portion, so that the search range of the partition mode is reduced, the search process is accelerated, and the search efficiency is improved.

In one embodiment of this application, a method for skipping some of the partition modes to be searched according to the block partition result in step S1020 includes: determining a partition attribute of a current coding unit according to the block partition result, the partition attribute including at least one of a partition direction, a partition location, and a multi-type tree partition depth; and skipping, in response to that the partition attribute satisfies a preset attribute condition, a to-be-searched partition mode that is matched with the attribute condition.

In one embodiment of this application, by using the partition direction as the partition attribute, it may be determined, according to the block partition result of the coded portion of the current video frame, partition directions of partition modes for performing multi-type tree partition on the current coding unit, the partition directions including a horizontal direction and a vertical direction.

In the embodiment of this application, the possibility of an optimal partition direction may be inferred according to the detected partition direction of the coded portion of the current video frame, so that a subsequent partition mode having low possibility is skipped. For example, in the coded portion of the current video frame, in response to that the partition directions of the partition modes are the horizontal direction, searching for a partition mode matched with the vertical direction is skipped; and in response to that the partition directions of the partition modes are the vertical direction, searching for a partition mode matched with the horizontal direction is skipped.

Figure 11:
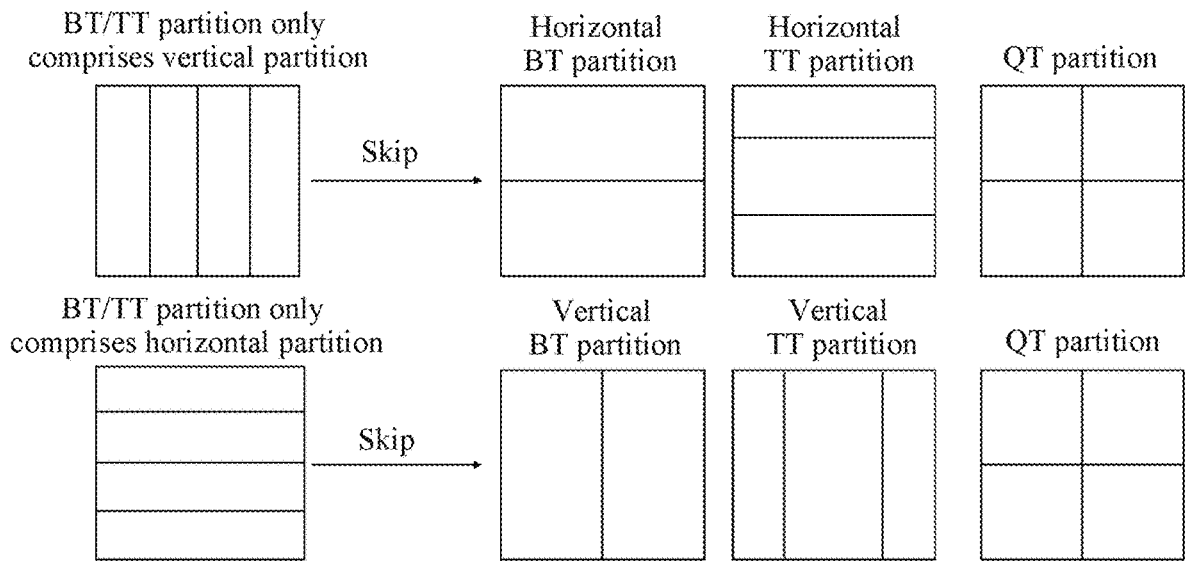
FIG. 11 is a schematic diagram of a principle of skipping some of partition modes to be searched according to a partition direction of a coded portion according to an embodiment of this application.

FIG. 11 is a schematic diagram of a principle of skipping some of partition modes to be searched according to a partition direction of a coded portion according to an embodiment of this application.

As shown in FIG. 11, when a maximum depth of a multi-type tree (MTT) is greater than or equal to 2, if the BT or TT of a current CU merely includes horizontal partition, it is indicated that the current CU almost has no possibility of vertical partition, and a coder may skip the remaining partition including vertical partition, i.e., skipping searching for vertical binary tree (BT) partition, vertical ternary tree (TT) partition, and quaternary tree (QT) partition. Similarly, if the BT or TT of the current CU merely includes vertical partition, it is indicated that the current CU almost has no possibility of horizontal partition, and the coder may skip the remaining partition including horizontal partition, i.e., skipping searching for horizontal binary tree (BT) partition, horizontal ternary tree (TT) partition, and quaternary tree (QT) partition.

In one embodiment of this application, the determining a partition attribute of a current coding unit according to the block partition result may further include: searching the block partition result for a historical coding unit located at a same location and having a same size with the current coding unit; and obtaining partition directions of partition modes for performing multi-type tree partition on the historical coding unit, and using a partition direction of the historical coding unit as a selected partition direction of the current coding unit.

In response to that the partition direction is a horizontal direction, searching for the partition mode matched with a vertical direction is skipped, for example, skipping searching for vertical binary tree partition and vertical ternary tree partition. In response to that the selected partition direction is the vertical direction, searching for a partition mode matched with the horizontal direction is skipped, for example, skipping searching for horizontal binary tree partition and horizontal ternary tree partition.

With continued reference to FIG. 6, QT, BT, and TT partition is recursively performed according to different partition paths in VVC, and thus, the CUs located at a same location and having a same size are checked multiple times by different partition paths. However, different partition paths cause the CUs located at the same location and having the same size have different context information, so that the CUs finally selects different partition. For the CUs located at the same location and having the same size, if historical horizontal BT and TT partition is superior to vertical BT and TT partition, for the CUs, checking the vertical BT and TT partition is subsequently skipped. Similarly, if historical vertical BT and TT partition is superior to horizontal BT and TT partition, for the CUs, checking the horizontal BT and TT partition is subsequently skipped.

In one embodiment of this application, by taking a partition location as the partition attribute, partition locations of sub coding units in the current coding unit may be determined according to the block partition result of the coded portion of the current video frame, and the partition locations include a plurality of partition locations in a vertical direction corresponding to vertical ternary tree partition, and a plurality of partition locations in a horizontal direction corresponding to horizontal ternary tree partition.

Matching detection is performed on the partition locations of the sub coding units and a partition location of a target partition mode to determine whether the partition locations of the sub coding units overlap with the partition location of the target partition mode; and in response to that the partition locations of the sub coding units do not overlap with the partition location of the target partition mode, searching for the target partition mode is skipped, and the target partition mode includes at least one of the horizontal ternary tree partition and the vertical ternary tree partition.

Figure 12:
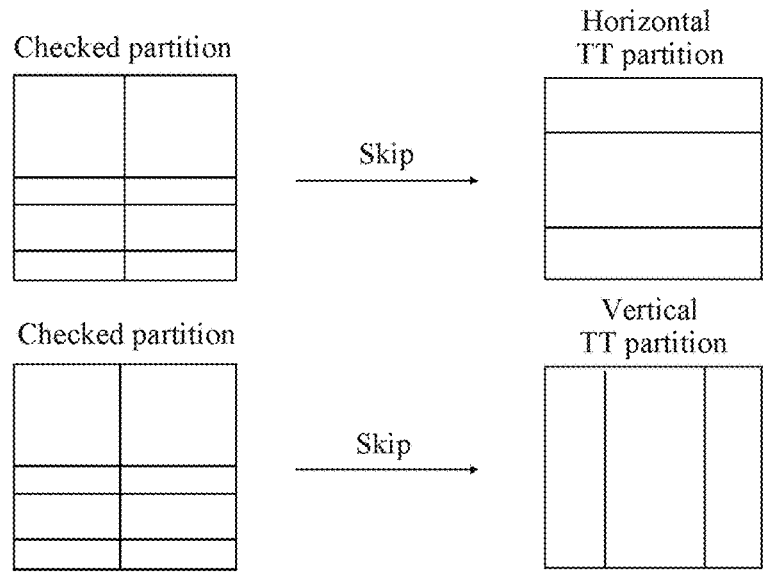
FIG. 12 is a schematic diagram of a principle of skipping some of partition modes to be searched according to a partition location of a coded portion according to an embodiment of this application.

FIG. 12 is a schematic diagram of a principle of skipping some of partition modes to be searched according to a partition location of a coded portion according to an embodiment of this application.

As shown in FIG. 12, when a maximum depth of a multi-type tree (MTT) is greater than or equal to 2, in the partition of a current CU that has been completed, if all sub CUs are not partitioned at a location where horizontal TT partition is performed on the current CU, it is indicated that the horizontal TT partition is not suitable for the current CU, and thus, checking horizontal TT by the current CU may be skipped. Similarly, if all sub CUs are not partitioned at a location where vertical TT partition is performed on the current CU, it is indicated that the vertical TT partition is not suitable for the current CU, and thus, checking vertical TT by the current CU may be skipped.

In one embodiment of this application, by using a multi-type tree partition depth as a partition attribute, multi-type tree partition depths of the sub coding units of the current coding unit may be determined according to a block partition result of the coded portion of the current coding unit.

The multi-type tree partition depths of the sub coding units are compared with a preset maximum depth to determine whether a sub coding unit with a multi-type tree partition depth reaching the maximum depth is present in the current coding unit; and in response to that the sub coding unit with the multi-type tree partition depth reaching the maximum depth is present in the current coding unit, searching for other partition modes than quaternary tree partition is skipped.

In an embodiment of this application, when the maximum depth of the multi-type tree (TT) is greater than or equal to 2, after the QT of the current CU is completed, if there is a sub CU that is further partitioned to a maximum MTT depth in QT partition, it is represented that the current CU needs very fine partition. If the BT or TT partition is directly performed on the current CU, the sub CUs having a same size with that of the sub CUs obtained through QT partition cannot be obtained, and thus, checking the BT and TT partition by the current CU may be skipped.

As stated in the embodiments above, by applying the historical information of the reference frame or the coded portion of the current video frame, this application can accelerate searching for the partition mode of the remaining portion to be coded, so that the coding complexity of a coder is reduced, and video compression efficiency can be ensured.

Although the steps of the method in this application are described in a specific order in the accompanying drawings, this does not require or imply that the steps are necessarily performed in the specific order, or all the steps shown are necessarily performed to achieve an expected result. Additionally, or alternatively, some steps may be omitted, a plurality of steps may be combined into one step for execution, and/or one step may be decomposed into a plurality of steps for execution, and the like.

Figure 13:
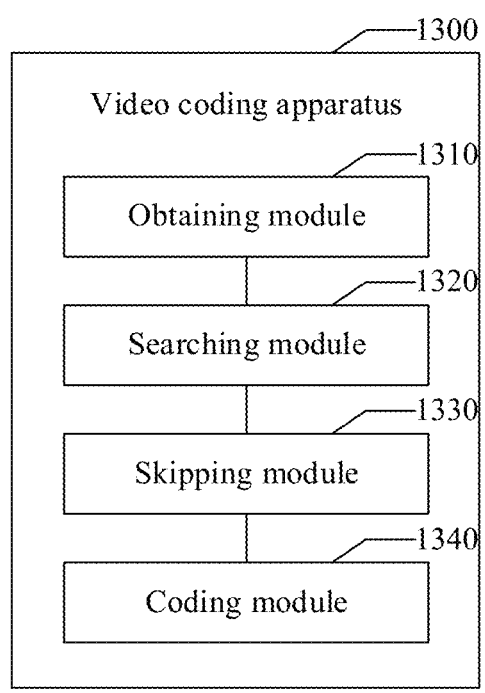
FIG. 13 is a structural block diagram of a video coding apparatus according to an embodiment of this application.

The apparatus embodiments of this application are described below and may be used for performing the video coding method according to the foregoing embodiments of this application. FIG. 13 is a structural block diagram of a video coding apparatus according to an embodiment of this application. As shown in FIG. 13, the video coding apparatus 1300 includes: an obtaining module 1310, configured to obtain a current video frame, and determine a reference frame to which reference is made during coding of the current video frame; a searching module 1320, configured to search for partition modes used for performing block partition on a portion to be coded of the current video frame; a skipping module 1330, configured to skip some of partition modes to be searched according to coding information of the reference frame or coding information of a coded portion of the current video frame; and a coding module 1340, configured to perform, according to a found partition mode, predictive coding on coding units that constitute the portion to be coded.

In some embodiments of this application, on the basis of the foregoing embodiments, the skipping module 1330 includes: a first result determining module, configured to determine, according to the coding information of the reference frame, a block partition result obtained by performing block partition on the reference frame; and a first mode skipping module, configured to skip some of the partition modes to be searched according to the block partition result.

In some embodiments of this application, on the basis of the foregoing embodiments, the first mode skipping module includes: a reference frame selecting module, configured to select a target reference frame from one or more reference frames to which reference is made during coding of the current video frame; an average size determining module, configured to determine, according to a block partition result of the target reference frame, an average size of coding units that constitute the target reference frame; a maximum size determining module, configured to determine, according to the average size, a maximum size used for searching for the partition mode of the current video frame; and a partition mode skipping module, configured to skip, in response to that the size of a current coding unit in the current video frame is greater than the maximum size, other to-be-searched block partition modes than a target partition mode.

In some embodiments of this application, on the basis of the foregoing embodiments, the reference frame selecting module includes: a first frame selecting module, configured to select, in response to that there is one reference frame to which reference is made during coding of the current video frame, the reference frame as the target reference frame; and a second frame selecting module, configured to select, in response to that there are a plurality of reference frames to which reference is made during coding of the current video frame, the target reference frame from the plurality of reference frames according to a quantization parameter of each video frame.

In some embodiments of this application, on the basis of the foregoing embodiments, the second frame selecting module includes: a quantization parameter difference value determining module, configured to determine quantization parameter difference values between the reference frames and the current video frame according to the quantization parameter of each video frame; and a target reference frame selecting module, configured to select a reference frame having a minimum quantization parameter difference value with the current video frame as the target reference frame.

In some embodiments of this application, on the basis of the foregoing embodiments, the target reference frame selecting module is further configured to: select, in response to that there is one reference frame having the minimum quantization parameter difference value with the current video frame, the reference frame as the target reference frame; and select, in response to that there are a plurality of reference frames having the minimum quantization parameter difference value with the current video frame, from the plurality of reference frames having the minimum quantization parameter difference value with the current video frame, a reference frame closest to the current video frame as the target reference frame.

In some embodiments of this application, on the basis of the foregoing embodiments, the average size determining module is configured to: determine a width and height of each coding unit in the target reference frame according to the block partition result of the target reference frame; determine an average width and an average height of the coding units in the target reference frame according to the width and height of each coding unit in the target reference frame; and use the average width or the average height as the average size of the coding units that constitute the target reference frame.

In some embodiments of this application, on the basis of the foregoing embodiments, the maximum size determining module includes: a parameter difference value determining module, configured to obtain a quantization parameter difference value between the target reference frame and the current video frame; a parameter difference value mapping module, configured to perform mapping processing on the quantization parameter difference value to obtain a compensation value that is positively correlated with the quantization parameter difference value; a numerical compensation module, configured to perform numerical compensation on the average size according to the compensation value to obtain a compensated size; and a range searching module, configured to determine, according to a numerical range where the compensated size is located, the maximum size used for searching for the partition mode of the current video frame.

In some embodiments of this application, on the basis of the foregoing embodiments, the parameter difference value mapping module is configured to: use a product of the quantization parameter difference value and a preset compensation coefficient as a compensation value, the compensation coefficient being a preset value greater than 0.

In some embodiments of this application, on the basis of the foregoing embodiments, the range searching module is configured to: determine, in response to that the compensated size is less than a preset first threshold, that the maximum size used for searching for the partition mode of the current video frame is a preset first size; determine, in response to that the compensated size is greater than or equal to the first threshold and is less than a preset second threshold, that the maximum size used for searching for the partition mode of the current video frame is a preset second size; and determine, in response to that the compensated size is greater than or equal to the second threshold, that the maximum size used for searching for the partition mode of the current video frame is a preset third size, where the first size, the second size, and the third size are in a multiple relationship of scaling up in equal proportion.

In some embodiments of this application, on the basis of the foregoing embodiments, the partition modes to be searched include at least one of quaternary tree partition, horizontal binary tree partition, vertical binary tree partition, horizontal ternary tree partition, and vertical ternary tree partition, and the target partition mode is quaternary tree partition.

In some embodiments of this application, on the basis of the foregoing embodiments, the skipping module 1330 includes: a second result determining module, configured to determine, according to the coding information of the coded portion of the current video frame, a block partition result obtained by performing block partition on the coded portion; and a second mode skipping module, configured to skip some of the partition modes to be searched according to the block partition result.

In some embodiments of this application, on the basis of the foregoing embodiments, the second mode skipping module includes: a partition attribute determining module, configured to determine a partition attribute of a current coding unit according to the block partition result, the partition attribute including at least one of a partition direction, a partition location, and a multi-type tree partition depth; and a partition mode skipping module, configured to skip, in response to that the partition attribute satisfies a preset attribute condition, a to-be-searched partition mode that is matched with the attribute condition.

In some embodiments of this application, on the basis of the foregoing embodiments, the partition attribute determining module includes: a partition direction determining module, configured to determine, according to the block partition result, partition directions of partition modes for performing multi-type tree partition on the current coding unit, the partition directions including a horizontal direction and a vertical direction.

In some embodiments of this application, on the basis of the foregoing embodiments, the partition mode skipping module includes: a first direction skipping module, configured to skip, in response to that the partition directions of the partition modes are the horizontal direction, searching for a partition mode matched with the vertical direction; and a second direction skipping module, configured to skip, in response to that the partition directions of the partition modes are the vertical direction, searching for a partition mode matched with the horizontal direction.

In some embodiments of this application, on the basis of the foregoing embodiments, the first direction skipping module is configured to skip searching for vertical binary tree partition, vertical ternary tree partition, and quaternary tree partition; and the second direction skipping module is configured to skip searching for horizontal binary tree partition, horizontal ternary tree partition, and quaternary tree partition.

In some embodiments of this application, on the basis of the foregoing embodiments, the partition attribute determining module includes: a partition location determining module, configured to determine partition locations of sub coding units in the current coding unit according to the block partition result, the partition locations including a plurality of partition locations in a vertical direction corresponding to vertical ternary tree partition, and a plurality of partition locations in a horizontal direction corresponding to horizontal ternary tree partition.

In some embodiments of this application, on the basis of the foregoing embodiments, the partition mode skipping module includes: a location matching detection module, configured to perform matching detection on the partition locations of the sub coding units and a partition location of a target partition mode to determine whether the partition locations of the sub coding units overlap with the partition location of the target partition mode; and a location skipping module, configured to skip, in response to that the partition locations of the sub coding units do not overlap with the partition location of the target partition mode, searching for the target partition mode, the target partition mode including at least one of the horizontal ternary tree partition and the vertical ternary tree partition.

In some embodiments of this application, on the basis of the foregoing embodiments, the partition attribute determining module includes: a depth determining module, configured to determine multi-type tree partition depths of the sub coding units of the current coding unit according to the block partition result.

In some embodiments of this application, on the basis of the foregoing embodiments, the partition mode skipping module includes: a maximum depth determining module, configured to compare the multi-type tree partition depths of the sub coding units with a preset maximum depth to determine whether a sub coding unit with a multi-type tree partition depth reaching the maximum depth is present in the current coding unit; and a depth skipping module, configured to skip, in response to that the sub coding unit with the multi-type tree partition depth reaching the maximum depth is present in the current coding unit, searching for other partition modes than quaternary tree partition.

In some embodiments of this application, on the basis of the foregoing embodiments, the partition attribute determining module includes: a historical coding unit determining module, configured to search the block partition result for a historical coding unit located at a same location and having a same size with the current coding unit; and a selected partition direction determining module, configured to obtain partition directions of partition modes for performing multi-type tree partition on the historical coding unit, and use a partition direction of the historical coding unit as a selected partition direction of the current coding unit.

In some embodiments of this application, on the basis of the foregoing embodiments, the partition mode skipping module includes: a third direction skipping module, configured to skip, in response to that the selected partition direction is a horizontal direction, searching for the partition mode matched with a vertical direction; and a fourth direction skipping module, configured to skip, in response to that the selected partition direction is the vertical direction, searching for a partition mode matched with the horizontal direction.

In some embodiments of this application, on the basis of the foregoing embodiments, the third direction skipping module is configured to skip searching for vertical binary tree partition and vertical ternary tree partition. In some embodiments of this application, on the basis of the foregoing embodiments, the fourth direction skipping module is configured to skip searching for the partition mode matched with the horizontal direction, including: skipping searching for horizontal binary tree partition and horizontal ternary tree partition.

Specific details of the video coding apparatus provided in each embodiment of this application are described in detail in the corresponding method embodiment and are not described herein again.

Figure 14:
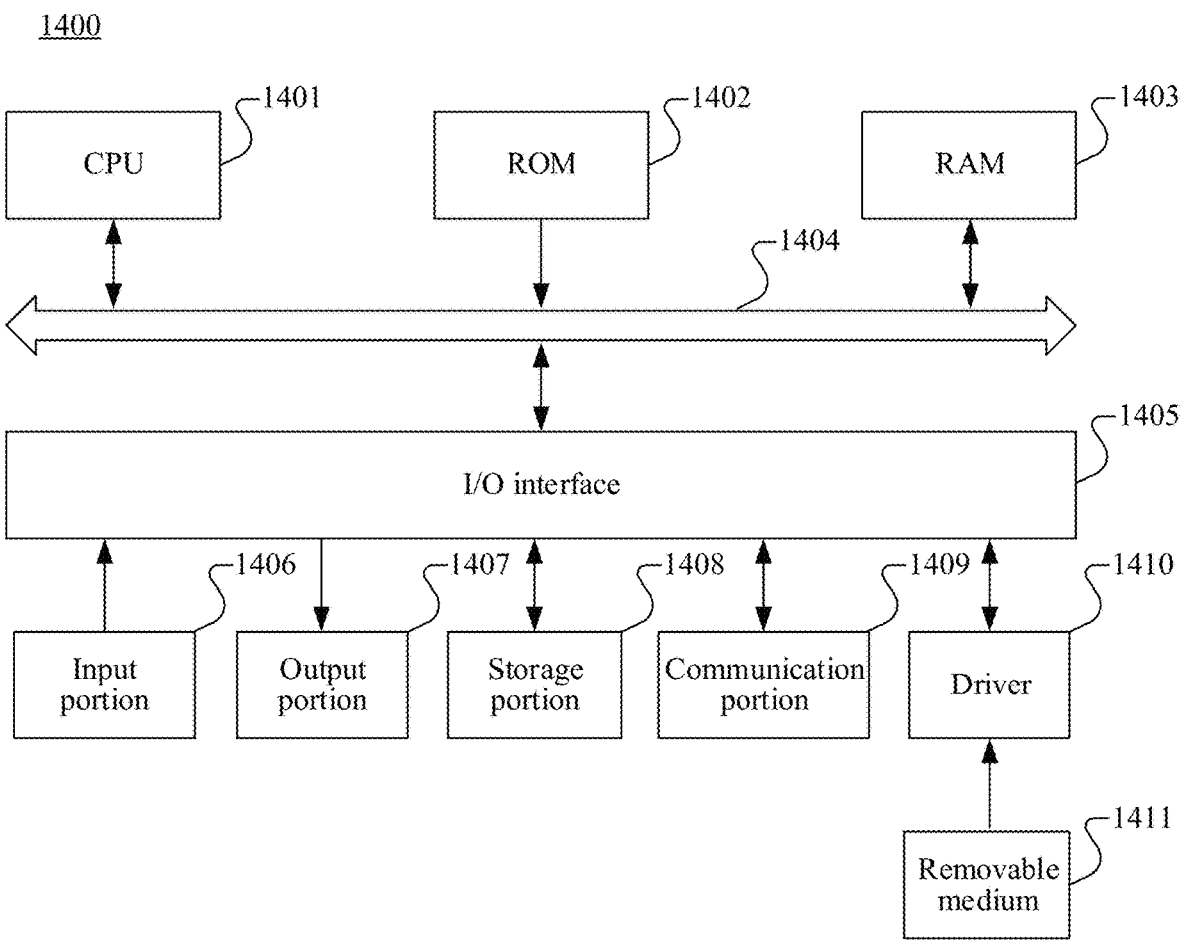
FIG. 14 is a structural block diagram of a computer system suitable for implementing an electronic device according to an embodiment of this application.

FIG. 14 is a structural block diagram of a computer system used for implementing an electronic device according to an embodiment of this application.

It is to be that the computer system 1400 of the electronic device shown in FIG. 14 is merely an example and does not constitute any limitation on functions and use ranges of the embodiments of this application.

As shown in FIG. 14, the computer system 1400 includes a central processing unit (CPU) 1401 which may perform various suitable actions and processing according to a program stored in a read-only memory (ROM) 1402 or a program loaded from a storage portion 1408 into a random access memory (RAM) 1403. The RAM 1403 further stores various programs and data required for system operations. The CPU 1401, the ROM 1402, and the RAM 1403 are connected to each other through a bus 1404. An input/output interface 1405 (i.e., an I/O interface) is also connected to the bus 1404.

The following components are connected to the I/O interface 1405: an input portion 1406 including a keyboard, a mouse, and the like; an output portion 1407 including a cathode ray tube (CRT), a liquid crystal display (LCD), a speaker, and the like; a storage portion 1408 including a hard disk and the like; and a communication portion 1409 including, for example, an local area network card, a modem, and other network interface cards. The communication portion 1409 performs communication processing by using a network such as the Internet. A driver 1410 is also connected to the I/O interface 1405 according to requirements. A removable medium 1411, such as a magnetic disk, an optical disc, a magneto-optical disk, or a semiconductor memory, is installed on the drive 1410 according to requirements, so that a computer program read from the removable medium is installed into the storage portion 1408 according to requirements.

Particularly, according to an embodiment of this application, the process described in each method flowchart may be implemented as a computer software program. For example, an embodiment of this application includes a computer program product. The computer program product includes a computer program carried on a computer-readable medium, and the computer program includes a program code used for performing the video coding method shown in the flowcharts. In such an embodiment, the computer program may be downloaded and installed from a network through the communication portion 1409, and/or installed from the removable medium 1411. When the computer program is executed by the CPU 1401, various functions defined in the system of this application are executed.

It is to be that the computer-readable medium shown in the embodiment of this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In addition, in this application, the computer-readable signal medium may include a data signal being in a baseband or propagated as a part of a carrier, the data signal carrying a computer-readable program code. A data signal propagated in such a way may use a plurality of forms, including, but not limited to, an electromagnetic signal, an optical signal, or any appropriate combination thereof. The computer-readable signal medium may be further any computer-readable medium except the computer-readable storage medium. The computer-readable medium may send, propagate, or transmit a program that is used by or used in combination with an instruction execution system, apparatus, or device. The program code included on the computer-readable medium may be transmitted by any suitable medium, including but not limited to wireless, wired, and the like, or any appropriate combination thereof.

The flowcharts and block diagrams in the accompanying drawings illustrate system architectures, functions and operations that may be implemented by a system, a method, and a computer program product according to various embodiments of this application. In this regard, each block in the flowcharts or block diagrams may represent a module, a program segment, or a part of a code. The module, the program segment, or the part of the code includes one or more executable instructions used for implementing specified logic functions. In some alternative implementations, the functions annotated in the blocks may alternatively occur in a sequence different from that annotated in an accompanying drawing. For example, two blocks shown in succession may, in fact, be executed substantially concurrently, or the blocks may sometimes be executed in the reverse order, depending upon the functionality involved. It is also to be noted that each box in the block diagrams and/or flowcharts, and a combination of the blocks in the block diagrams and/or the flowcharts may be implemented by a dedicated hardware-based system that performs a specified function or operation, or may be implemented by using a combination of dedicated hardware and a computer instruction.

Although a plurality of modules or units of a device configured to perform actions are mentioned in the foregoing detailed description, such partition is not mandatory. Actually, according to the implementations of this application, the features and functions of two or more modules or units described above may be specifically implemented in one module or unit. On the contrary, the features and functions of one module or unit described above may be further partitioned to be embodied by a plurality of modules or units.

According to the foregoing descriptions of the implementations, a person skilled in the art may readily understand that the implementations described herein may be implemented by using software or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the method according to the embodiments of this application.

A person skilled in the art may easily conceive of other implementation solutions of this application after considering the specification and practicing the present disclosure. This application is intended to cover any variations, uses, or adaptive changes of this application. These variations, uses, or adaptive changes follow the general principles of this application and include common general knowledge or common technical means in the art, which are not disclosed in this application.

It is to be understood that this application is not limited to the precise structures described above and shown in the accompanying drawings, and various modifications and changes can be made without departing from the scope of this application. The scope of this application is subject only to the appended claims.

What is claimed is:

1. A video coding method, comprising:
   obtaining a current video frame, and determining a reference frame used when coding the current video frame;
   searching for partition modes used for performing block partition on a portion of the current video frame to be coded;
   determining a block partition result obtained by performing block partition on the reference frame according to coding information of the reference frame;
   skipping one or more partition modes to be searched according to the block partition result; and
   performing predictive coding on coding units that constitute the portion to be coded according to an identified partition mode,
   wherein the skipping the one or more partition modes according to the block partition result comprises:
   selecting a target reference frame from one or more reference frames used when coding the current video frame;
   determining an average size of coding units that constitute the target reference frame according to a block partition result of the target reference frame;
   determining a maximum size used for searching for the partition mode of the current video frame according to the average size; and
   skipping block partition modes other than a target partition mode in response to that the size of a current coding unit in the current video frame is greater than the maximum size.

2. The method according to claim 1, wherein the selecting the target reference frame from the one or more reference frames used when coding the current video frame comprises:
   selecting the reference frame as the target reference frame in response to one reference frame being used when coding the current video frame; and
   selecting the target reference frame from plurality of reference frames according to a quantization parameter of each video frame in response to the plurality of reference frames being used when coding the current video frame.

3. The method according to claim 2, wherein the selecting the target reference frame from the plurality of reference frames according to the quantization parameter of each video frame comprises:
   determining quantization parameter difference values between the reference frames and the current video frame according to the quantization parameter of each video frame; and
   selecting a reference frame having a minimum quantization parameter difference value with the current video frame as the target reference frame.

4. The method according to claim 3, wherein the selecting the reference frame having the minimum quantization parameter difference value with the current video frame as the target reference frame comprises:
   selecting the reference frame as the target reference frame in response to one reference frame having the minimum quantization parameter difference value with the current video frame; and
   selecting a reference frame closest to the current video frame as the target reference frame from a plurality of reference frames having the minimum quantization parameter difference value with the current video frame, in response to the plurality of reference frames having the minimum quantization parameter difference value with the current video frame.

5. The method according to claim 1, wherein the determining, according to the block partition result of the target reference frame, the average size of the coding units that constitute the target reference frame comprises:
   determining a width and height of each coding unit in the target reference frame according to the block partition result of the target reference frame;
   determining an average width and an average height of the coding units in the target reference frame according to the width and height of each coding unit in the target reference frame; and
   using the average width or the average height as the average size of the coding units that constitute the target reference frame.

6. The method according to claim 1, wherein the determining, according to the average size, the maximum size used for searching for the partition mode of the current video frame comprises:

obtaining a quantization parameter difference value between the target reference frame and the current video frame;
performing mapping processing on the quantization parameter difference value to obtain a compensation value that is positively correlated with the quantization parameter difference value;
performing numerical compensation on the average size according to the compensation value to obtain a compensated size; and
determining the maximum size used for searching for the partition mode of the current video frame according to a numerical range where the compensated size is located.

7. The method according to claim 6, wherein the performing mapping processing on the quantization parameter difference value to obtain the compensation value that is positively correlated with the quantization parameter difference value comprises:
using a product of the quantization parameter difference value and a compensation coefficient as a compensation value, the compensation coefficient being a value greater than 0.

8. The method according to claim 6, wherein the determining the maximum size used for searching for the partition mode of the current video frame according to the numerical range where the compensated size is located comprises:
determining that the maximum size used for searching for the partition mode of the current video frame is a first size in response to the compensated size being less than a first threshold;
determining that the maximum size used for searching for the partition mode of the current video frame is a second size in response to the compensated size being greater than or equal to the first threshold and is less than a second threshold; and
determining that the maximum size used for searching for the partition mode of the current video frame is a third size in response to the compensated size being greater than or equal to the second threshold, wherein
the first size, the second size, and the third size are in a multiple relationship of scaling up in equal proportion.

9. The method according to claim 1, wherein the partition modes to be searched comprise at least one of quaternary tree partition, horizontal binary tree partition, vertical binary tree partition, horizontal ternary tree partition, or vertical ternary tree partition, and the target partition mode is quaternary tree partition.

10. The method according to claim 1, further comprising:
determining a first block partition result obtained by performing block partition on a coded portion according to coding information of the coded portion of the current video frame; and
skipping one or more first partition modes according to the first block partition result.

11. The method according to claim 10, wherein the skipping the one or more first partition modes according to the first block partition result comprises:
determining a partition attribute of a current coding unit according to the first block partition result, the partition attribute comprising at least one of a partition direction, a partition location, or a multi-type tree partition depth; and
skipping a partition mode that is matched with a preset attribute condition in response to the partition attribute satisfying the preset attribute condition.

12. The method according to claim 11, wherein the determining the partition attribute of the current coding unit according to the first block partition result comprises:
determining partition directions of partition modes for performing multi-type tree partition on the current coding unit according to the first block partition result, the partition directions comprising a horizontal direction and a vertical direction.

13. The method according to claim 12, wherein the skipping the partition mode that is matched with the attribute condition in response to the partition attribute satisfying the preset attribute condition, comprises:
skipping searching for a partition mode matched with the vertical direction in response to the partition directions of the partition modes being the horizontal direction; and
skipping searching for a partition mode matched with the horizontal direction in response to the partition directions of the partition modes being the vertical direction.

14. The method according to claim 13, wherein the skipping searching for the partition mode matched with the vertical direction comprises: skipping searching for vertical binary tree partition, vertical ternary tree partition, or quaternary tree partition; and
the skipping searching for the partition mode matched with the horizontal direction comprises: skipping searching for horizontal binary tree partition, horizontal ternary tree partition, or quaternary tree partition.

15. The method according to claim 11, wherein the determining the partition attribute of the current coding unit according to the first block partition result comprises:
determining partition locations of sub coding units in the current coding unit according to the first block partition result, the partition locations comprising a plurality of partition locations in a vertical direction corresponding to vertical ternary tree partition, and a plurality of partition locations in a horizontal direction corresponding to horizontal ternary tree partition.

16. A non-transitory computer-readable medium, having a computer program stored thereon, the computer program, when executed by one or more processors, implementing a video coding method, comprising:
obtaining a current video frame, and determining a reference frame used when coding the current video frame;
searching for partition modes used for performing block partition on a portion of the current video frame to be coded;
determining a block partition result obtained by performing block partition on the reference frame according to coding information of the reference frame;
skipping one or more partition modes to be searched according to the block partition result; and
performing predictive coding on coding units that constitute the portion to be coded according to an identified partition mode,
wherein the skipping the one or more partition modes according to the block partition result comprises:
selecting a target reference frame from one or more reference frames used when coding the current video frame;
determining an average size of coding units that constitute the target reference frame according to a block partition result of the target reference frame;
determining a maximum size used for searching for the partition mode of the current video frame according to the average size; and skipping block partition modes other than a target partition mode in response to that the size of a current coding unit in the current video frame is greater than the maximum size.

17. The computer-readable medium according to claim 16, wherein the skipping the one or more partition modes according to the coding information of the reference frame or the coding information of the coded portion of the current video frame comprises:
    determining a block partition result obtained by performing block partition on the reference frame according to the coding information of the reference frame; and
    skipping one or more of the partition modes to be searched according to the block partition result.

18. An electronic device, comprising:
    one or more processors; and
    a memory, configured to store an instruction executable by the one or more processors,
    the one or more processors being configured to execute the executable instruction to implement:
        obtaining a current video frame, and determining a reference frame used when coding the current video frame;
        searching for partition modes used for performing block partition on a portion of the current video frame to be coded;
        determining a first block partition result obtained by performing block partition on a coded portion according to coding information of the coded portion of the current video frame;
        determining a partition attribute of a current coding unit according to the first block partition result, the partition attribute comprising at least one of a partition direction, a partition location, or a multi-type tree partition depth;
        skipping a partition mode that is matched with a preset attribute condition in response to the partition attribute satisfying the preset attribute condition; and
        performing predictive coding on coding units that constitute the portion to be coded according to an identified partition mode.

* * * * *